(12) United States Patent
Arnett et al.

(10) Patent No.: US 11,199,101 B2
(45) Date of Patent: Dec. 14, 2021

(54) SYSTEM AND METHOD TO APPLY MULTIPLE THERMAL TREATMENTS TO WORKPIECE AND RELATED TURBOMACHINE COMPONENTS

(71) Applicant: General Electric Company, Schenectady, NY (US)

(72) Inventors: Michael Douglas Arnett, Simpsonville, SC (US); Jon Conrad Schaeffer, Greenville, SC (US); Arthur Samuel Peck, Greer, SC (US)

(73) Assignee: General Electric Company, Schenectady, NY (US)

( * ) Notice: Subject to any disclaimer, the term of this patent is extended or adjusted under 35 U.S.C. 154(b) by 167 days.

(21) Appl. No.: 16/712,136

(22) Filed: Dec. 12, 2019

(65) Prior Publication Data

US 2021/0180461 A1  Jun. 17, 2021

(51) Int. Cl.
*F01D 5/28* (2006.01)
*F01D 5/14* (2006.01)

(52) U.S. Cl.
CPC ............ *F01D 5/286* (2013.01); *F01D 5/147* (2013.01); *F05D 2230/40* (2013.01); *F05D 2240/31* (2013.01)

(58) Field of Classification Search
CPC .......... F01D 5/286; F01D 5/147; F01D 5/141; F01D 5/28; F05D 2240/31; F05D 2300/17; F05D 2300/175; F05D 2220/80; F05D 2240/302; F05D 2220/31; F05D 2240/307; F05D 2300/701; Y02T 50/60; C21D 9/0068; C21D 11/005; C21D 1/773; C21D 1/74
See application file for complete search history.

(56) References Cited

U.S. PATENT DOCUMENTS

| 7,875,135 | B2 | 1/2011 | Kelly et al. |
| 9,394,597 | B2 | 7/2016 | Hornig et al. |
| 10,640,849 | B1 * | 5/2020 | Cui ........................ C22C 19/056 |

(Continued)

FOREIGN PATENT DOCUMENTS

| DE | 112012005534 T5 | 9/2014 |
| EP | 0484025 A1 | 5/1992 |

(Continued)

OTHER PUBLICATIONS

U.S. Appl. No. 16/712,130, Office Action dated Sep. 20, 2021, 9 pages.

(Continued)

*Primary Examiner* — Aaron R Eastman
(74) *Attorney, Agent, or Firm* — Hoffman Warnick LLC (57) ABSTRACT

Embodiments of the disclosure provide a turbomachine component, including: a base portion configured for mounting on a rotor; an airfoil portion having a first end coupled to the base portion, and a second end opposite the first end. A creep resistance of the airfoil portion is greater than the base portion, and a fracture toughness of the airfoil portion is less than the base portion. A tip portion may be coupled to the second end of the airfoil portion. A creep resistance of the tip portion is less than the airfoil portion and greater than the base portion. A fracture toughness of the tip portion is less than the base portion and greater than the airfoil portion.

20 Claims, 6 Drawing Sheets

(56) References Cited

U.S. PATENT DOCUMENTS

| | | | |
|---|---|---|---|
| 11,143,033 B2* | 10/2021 | Kottilingam | B33Y 80/00 |
| 2004/0003873 A1 | 1/2004 | Chen et al. | |
| 2007/0003416 A1* | 1/2007 | Bewlay | B23K 35/327 |
| | | | 416/241 B |
| 2008/0073001 A1 | 3/2008 | Katsumata | |
| 2010/0043929 A1 | 2/2010 | Hobbs et al. | |
| 2012/0312426 A1* | 12/2012 | Suzuki | C23C 8/10 |
| | | | 148/284 |
| 2013/0022803 A1* | 1/2013 | Schaeffer | C30B 29/52 |
| | | | 428/220 |
| 2015/0247422 A1* | 9/2015 | Feng | B22D 7/005 |
| | | | 148/555 |
| 2016/0273074 A1* | 9/2016 | Smarsly | B22F 3/17 |
| 2017/0073806 A1* | 3/2017 | Schaeffer | C23C 14/5806 |
| 2018/0086672 A1* | 3/2018 | Hill | C23C 28/3455 |
| 2018/0230576 A1* | 8/2018 | Balsone | F01D 5/28 |
| 2019/0283138 A1* | 9/2019 | Sheng | C22C 1/0433 |
| 2021/0246534 A1* | 8/2021 | Cui | C22C 19/056 |

FOREIGN PATENT DOCUMENTS

| | | |
|---|---|---|
| EP | 1953251 A1 | 8/2008 |
| EP | 2267278 A2 | 12/2010 |
| GB | 2280580 A | 2/1995 |
| JP | 2004195551 A | 7/2004 |
| WO | 2014118722 A2 | 8/2014 |

OTHER PUBLICATIONS

EP Search Report for corresponding EP Application No. 20211601.8-1004 dated May 4, 2021, 8 pgs.

EP Search Report and Written Opinion for corresponding EP Application No. 20211595.2 dated May 21, 2021, 9 pgs.

\* cited by examiner

SYSTEM AND METHOD TO APPLY MULTIPLE THERMAL TREATMENTS TO WORKPIECE AND RELATED TURBOMACHINE COMPONENTS

CROSS-REFERENCE TO RELATED APPLICATIONS

This application is related to U.S. application Ser. No. 16/712,130, filed on Dec. 12, 2019, currently pending and hereby incorporated by reference in its entirety.

BACKGROUND

The disclosure relates generally to the thermal treatment of workpieces. More specifically, embodiments of the disclosure provide systems and methods to apply multiple thermal treatments to a workpiece such as a turbomachine component. In addition, the disclosure relates to turbomachine components and turbomachines with related structural properties.

Some aircraft and/or power plant systems, for example certain jet aircraft, or nuclear, simple cycle and combined cycle power plant systems, employ turbines (also referred to as turbomachines) in their design and operation. Some of these turbines employ airfoils (e.g., stationary or rotating turbine blades) which during operation are exposed to fluid flows. These airfoils are configured to aerodynamically interact with the fluid flows and generate shaft power (e.g., creating thrust, turning kinetic energy to mechanical energy, thermal energy to mechanical energy, etc.) from these fluid flows as part of power generation. As a result of this interaction and conversion, the material properties and aerodynamic characteristics and losses of these airfoils will affect system and turbine operation, performance, thrust, efficiency, and power.

Turbine airfoils, and specifically turbine blades, in various applications are subject to extreme stress and high temperature environments. The stress and exposure temperature varies throughout the part. During operation, different areas of a single turbomachine component may be prone to different mechanical factors, e.g., long-term mechanical creep in one area as compared to immediate stresses in another. This problem arises in part from conventional thermal treatment systems, which apply uniform treatments to a turbomachine component before it is deployed.

BRIEF DESCRIPTION

A first aspect of the disclosure provides a system for thermal treatment of a workpiece, the system including: an enclosure having an interior sized to enclose the workpiece, and configured to maintain a vacuum or a pressurized atmosphere within the interior; and a plurality of thermal applicators including: a first thermal applicator in thermal communication with a first portion of the interior and configured to apply a first thermal treatment to a first portion of the workpiece in the first portion of the interior, and a second thermal applicator in thermal communication with a second portion of the interior different from the first portion of the interior and configured to apply a second thermal treatment to a second portion of the workpiece in the second portion of the interior, wherein the second thermal applicator is operationally independent of the first thermal applicator.

A second aspect of the disclosure provides a system for thermal treatment of a workpiece, the system including: an enclosure having an interior sized to enclose the workpiece, and configured to maintain a vacuum or a pressurized atmosphere within the interior; a plurality of thermal applicators including: a first thermal applicator in thermal communication with a first portion of the interior and configured to apply a first thermal treatment to a first portion of the workpiece in the first portion of the interior, a second thermal applicator in thermal communication with a second portion of the interior different from the first portion of the interior and configured to apply a second thermal treatment to a second portion of the workpiece in the second portion of the interior, wherein the second thermal applicator is operationally independent of the first thermal applicator, and a third thermal applicator in thermal communication with a third portion of the interior different from the first portion and the second portion of the interior and configured to apply a third thermal treatment to a third portion of the workpiece in the third portion of the interior, wherein the third thermal applicator is operationally independent of the first and second thermal applicators.

A third aspect of the disclosure provides a method for thermal treatment of a workpiece formed of a superalloy material, the method including: enclosing a workpiece in an interior of an enclosure from an environment, the enclosure maintaining a vacuum or a pressurized atmosphere within the interior, wherein the workpiece includes a base portion and an airfoil portion coupled to the base portion; applying a first thermal treatment to the base portion of the workpiece, using a first thermal applicator in thermal communication with the base portion of the workpiece, wherein the first thermal treatment has limited impact on the airfoil portion of the workpiece; and applying a second thermal treatment to the airfoil portion of the workpiece, using a second thermal applicator in thermal communication with the interior of the enclosure and the airfoil portion of the workpiece, wherein the second thermal treatment has limited impact on the base portion of the workpiece.

A fourth aspect of the disclosure provides a turbomachine component, including: a base portion configured for mounting on a rotor; an airfoil portion having a first end coupled to the base portion, and a second end opposite the first end, wherein a creep resistance of the airfoil portion is greater than the base portion, and wherein a fracture toughness of the airfoil portion is less than the base portion; and a tip portion coupled to the second end of the airfoil portion, wherein a creep resistance of the tip portion is less than the airfoil portion and greater than the base portion, and wherein a fracture toughness of the tip portion is less than the base portion and greater than the airfoil portion.

A fifth aspect of the disclosure provides a turbomachine having an interior flowpath, the turbomachine including: a rotor; and a plurality of rotatable blade structures coupled to the rotor and positioned within the interior flowpath, at least one of the plurality of blade structures including: a base portion having an inner radial surface coupled to the rotor, an airfoil portion having an inner radial end coupled to the base portion, and an outer radial end opposite the inner radial end, wherein a creep resistance of the airfoil portion is greater than the base portion, and wherein a fracture toughness of the airfoil portion is less than the base portion, and a tip portion coupled to the outer radial end of the airfoil portion, wherein a creep resistance of the tip portion is less than the airfoil portion and greater than the base portion, and wherein a fracture toughness of the tip portion is less than the base portion and greater than the airfoil portion.

A sixth aspect of the disclosure provides a method for thermally treating a turbomachine component formed of a superalloy material, the method including: applying a first thermal treatment to a base portion of the turbomachine component, the base portion being configured for mounting on a rotor, wherein the first thermal treatment includes heating the base portion to a first temperature, holding the base portion at the first temperature for a first time span, and cooling the base portion at a first cooling rate; applying a second thermal treatment to an airfoil portion of the turbomachine component independently of the first thermal treatment, the airfoil portion having a first end coupled to the base portion, and a second end opposite the first end, wherein the second thermal treatment includes heating the airfoil portion to a second temperature different from the first temperature, holding the airfoil portion at the second temperature for a second time span different from the first time span, and cooling the airfoil portion at a second cooling rate different from the first cooling rate; and applying a third thermal treatment to a tip portion of the turbomachine component independently of the first thermal treatment and the second thermal treatment, the tip portion being coupled to the airfoil portion, wherein the third thermal treatment includes heating the tip portion to a third temperature different from the first temperature and the second temperature, holding the tip portion at the third temperature for a third time span different from the first time span and the second time span, and cooling the airfoil portion at a third cooling rate different from the first cooling rate and the second cooling rate.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant machine components within the various systems, components, and other embodiments of the disclosure. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a system and method to apply multiple thermal treatments to a workpiece, and further embodiments provide turbomachine components and related structures. As used herein, the term "thermal treatment" refers to a combination of heating and cooling at predetermined temperatures, time spans, and heating or cooling rates to produce desired material properties. In various embodiments, a system may include an enclosure having an interior sized to enclose the workpiece, and configured create a vacuum or a pressurized atmosphere within an interior of the enclosure. A plurality of thermal applicators may be in thermal communication with first and second portions of the interior. First and second thermal applicators may independently heat and cool the first and second portions of the interior. The first thermal applicator may apply a first thermal treatment to a first portion of the workpiece in the first portion of the interior. The second thermal applicator may sequentially or simultaneously apply a second thermal treatment to a second portion of the workpiece in the second portion of the interior independently of the first thermal treatment. Methods according to the disclosure may include applying first and second thermal treatments to first and second portions of a workpiece, e.g., using one or more embodiments of a system as discussed herein. Further embodiments of the disclosure provide a turbomachine component, turbomachine, and/or other structure with different portions having different properties arising from multiple thermal treatments.

Figure 1:
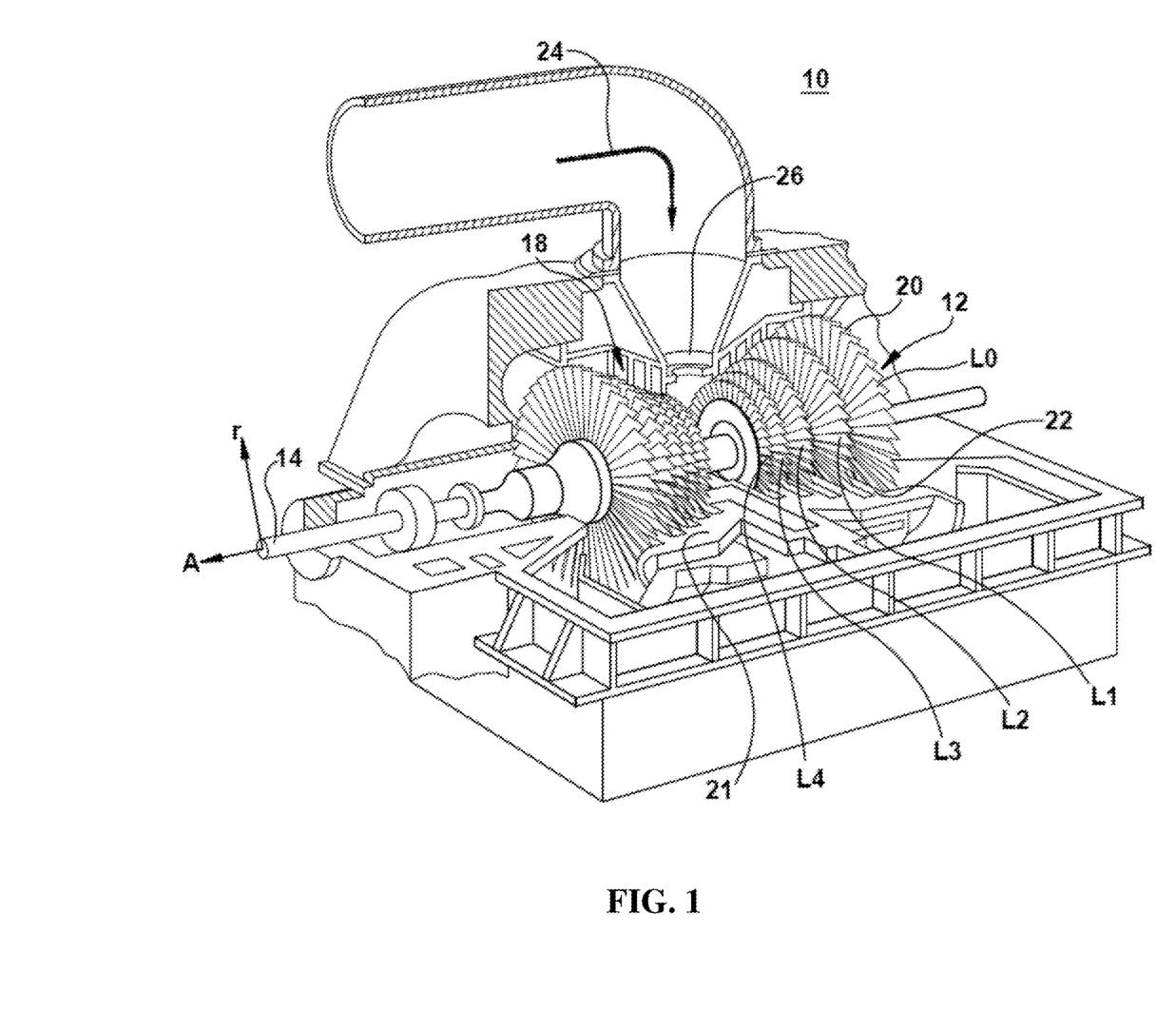
FIG. 1 shows a three-dimensional partial cut-away perspective view of a portion of a turbomachine according to an embodiment of the present disclosure.

Referring to the drawings, FIG. 1 shows a perspective partial cut-away illustration of a turbomachine 10 (e.g., a steam turbine) according to various embodiments of the disclosure. The view of turbomachine 10 may represent a high pressure (HP), intermediate pressure (IP), or low pressure (LP) turbine, and it is understood that embodiments of the disclosure may be especially applicable to HP and IP turbines. Turbomachine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially surround each rotor wheel 18. A static nozzle section 21 is shown including a plurality of stationary nozzles 22 that circumferentially around shaft 14, and the nozzles 22 are axially positioned between adjacent rows of blades 20. Stationary nozzles 22 cooperate with blades 20 to form a stage of turbomachine 10, and to define a portion of a flow path through turbomachine 10. As shown, static nozzle section 21 at least partially surrounds the rotor 12 (shown in this cut-away view).

It is understood that turbomachine 10 shown is a dual-flow turbomachine 10 that includes an axially centered inlet mouth which feeds two sets of turbine stages. It is understood that various teachings can be applied to axial turbines, e.g., axial inlet gas turbines that input a combustion gas from a first axial end and output that combustion gas to a second axial end after the gas has performed mechanical work on the turbine. During operation, an operative fluid such as steam 24 enters an inlet 26 of turbomachine 10 and is channeled through stationary nozzles 22. Nozzles 22 direct steam 24 against blades 20. Steam 24 passes through the remaining stages imparting a force on blades 20 causing shaft 14 to rotate. At least one end of turbomachine 10 may extend axially away from rotor 12 and may be attached to a load or machinery (not shown) such as, but not limited to, a generator, and/or another turbine.

In one embodiment, turbomachine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the disclosure do not require a multiple stage turbine. In other embodiments, turbomachine 10 may comprise an aircraft engine used to produce thrust or an industrial gas turbine. Embodiments of the disclosure may include turbomachine 10 with blades 20 and/or other structures which feature varying properties as a result of multiple thermal treatments being applied to different portions of each blade 20 and/or other component.

Figure 2:
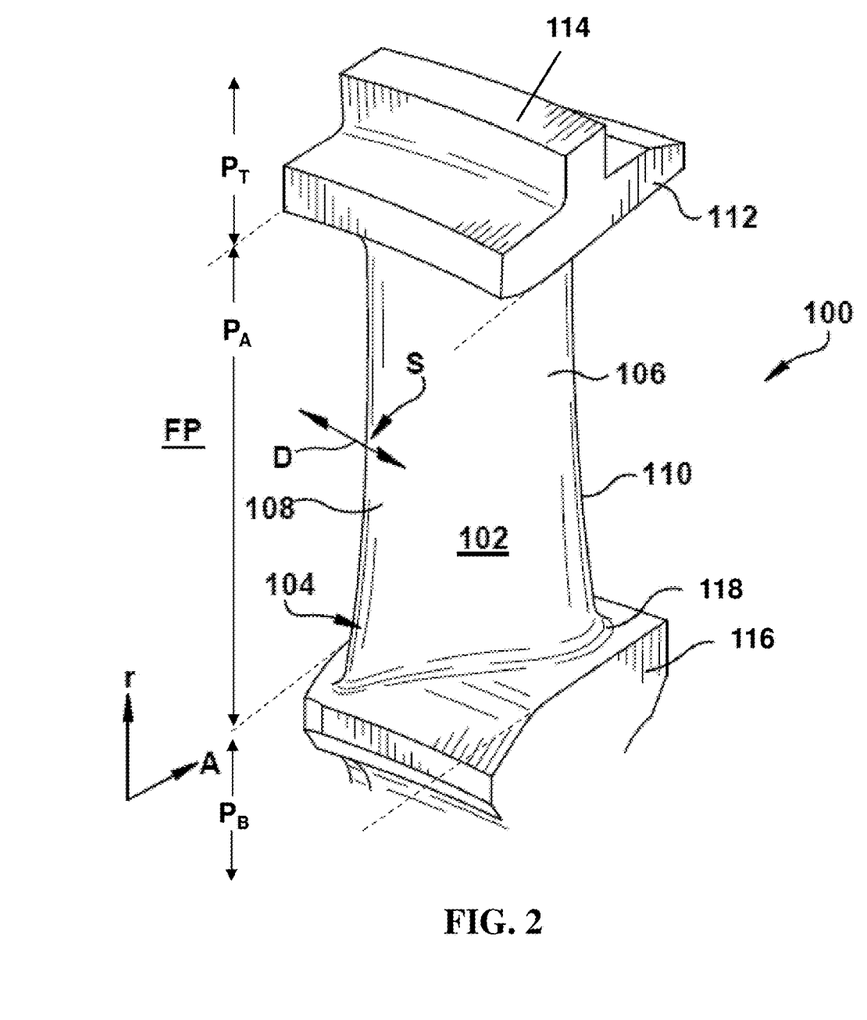
FIG. 2 shows a three-dimensional depiction of a workpiece in the form of an illustrative turbomachine component according to various embodiments of the present disclosure.

Turning to FIG. 2, a schematic three-dimensional depiction of a turbomachine component (or simply, component) 100 is shown according to various embodiments. Component 100 may represent a static or rotatable blade adapted for placement within a flowpath (FP) of a device, e.g., turbomachine 10 (FIG. 1). In some cases, component 100 may be a static nozzle included in an annulus of stationary nozzles in a stage of a turbine (e.g., turbomachine 10). During operation of a turbine (e.g., turbomachine 10), component(s) 100 in the form of a static nozzle may remain stationary in order to direct the flow of working fluid (e.g., gas or steam) to one or more movable blades (e.g., blades 20), causing those movable blades to initiate rotation of a rotor shaft (e.g., shaft 14). Regardless of whether component 100 is provided as a movable blade (e.g., blades 20) or static component such as a nozzle, embodiments of the disclosure may be operable to thermally treat component 100. It is understood that component 100 is configured to couple (mechanically couple via fasteners, welds, slot/grooves, etc.) with a plurality of similar or distinct nozzles (e.g., components 100 or other nozzles) to form an annulus of nozzles in a stage of the turbine. Component 100 in some cases may be formed of a single alloy or superalloy material. A superalloy material, also known as a "high-performance alloy," generally refers to one or more alloys meeting various sets of mechanical standards, e.g., mechanical strength, surface stability, corrosion resistance, etc. Classifications of superalloy materials may include, e.g., a nickel-based, cobalt-based, and/or iron-based superalloy materials. Nickel-based superalloy materials in particular may be capable of forming gamma prime phase precipitates under application of heat, as discussed herein.

Turbine component 100 includes an airfoil 102 having a suction side surface 104, and a pressure side surface 106 (partially obscured in FIG. 2) opposing suction side surface 104. Component 100 can also include a leading edge 108 between pressure side surface 106 and suction side surface 104, and a trailing edge 110 opposing leading edge 108 and between pressure side surface 106 and suction side surface 104. Airfoil 102 may have a hollow interior (not shown), and thus airfoil portion 102 may include contoured walls which enclose the hollow interior therein. The term "axial width," sometimes referred to as a "chord-wise width," may refer to the distance from one reference point (e.g., leading edge 108) directly through airfoil portion 102 along axis A to another reference point (e.g., a portion of suction side surface 104). Axial width in some cases may refer to the axial distance along axis A between one location on pressure side surface 106 and a corresponding location with respect to airfoil 102. For instance, axial width may be measured as the distance along axis A from leading edge 108 to a point tangentially aligned with trailing edge 110 of airfoil 102. The span of airfoil 102 along radial axis "r" may constitute an airfoil portion $P_A$ of component 100. In various embodiments discussed herein, airfoil portion $P_A$ may be formed to include distinct material properties as compared to one or more other portions of component 100.

As shown, component 100 may include, e.g., a tip 112 connected with airfoil 102. In some cases, tip 112 may include a shroud 114, e.g., for inclusion with and/or coupling to an outer ring for structural support of component 100. Tip 112 may be connected with airfoil portion 102 along suction side surface 104, pressure side surface 106, trailing edge 110 and leading edge 108. The span of tip 112, including shroud 114 where applicable, along radial axis "r" from airfoil 102 may constitute a tip portion $P_T$ of component 100. In various embodiments discussed herein, tip portion $P_T$ may be formed to include distinct material properties as compared to one or more other portions of component 100, e.g., airfoil portion $P_A$.

Component 100 may also include, e.g., a base 116 coupled to airfoil 102 at a location opposite tip 112. In various embodiments, a fillet 118 connects airfoil 102 to base 116. Fillet 118 may be formed via machining from an initial structure, and in some cases fillet 118 may be formed with the aid of welding, brazing, etc. In the case of a rotatable structure, e.g., blade(s) 20 (FIG. 1), base 116 of component 100 may be structured for mechanical coupling to shaft 14 (FIG. 1) of turbomachine 10 (FIG. 1) by any currently known or later developed component for mechanically coupling component 100 to other portions of turbomachine 10, e.g., a wheel and diaphragm assembly. The span of base 116 between airfoil 102 and the opposing end of base 116 along radial axis "r" may constitute a base portion $P_B$ of component 100. In various embodiments discussed herein, base portion $P_B$ may be formed to include distinct material properties as compared to one or more other portions of component 100, e.g., airfoil portion $P_A$ and tip portion $P_T$.

With reference to FIGS. 1 and 2, component 100 may be positioned within first stage (L4) or second stage (L3). In particular embodiments, component 100 may be positioned in second stage nozzle (L3), and the concentrated flow profile across component 100 reduces incident fluid flow within second stage (L3), or from second stage (L3) to subsequent stages. In various embodiments, turbomachine 10 can include a set of components 100 in only second stage (L3) of turbomachine 10, or in only first stage (L4) and second stage (L3) of turbomachine 10. Each portion $P_B$, $P_A$, $P_T$ of component 100 may have different properties by being subjected to different thermal treatments, as discussed herein. Thus, further embodiments of the disclosure may include turbomachine 10 having at least one blade 20, nozzle, and/or other structure which has been processed using multiple thermal treatments, and which thus features different material properties in each region.

Figure 3:
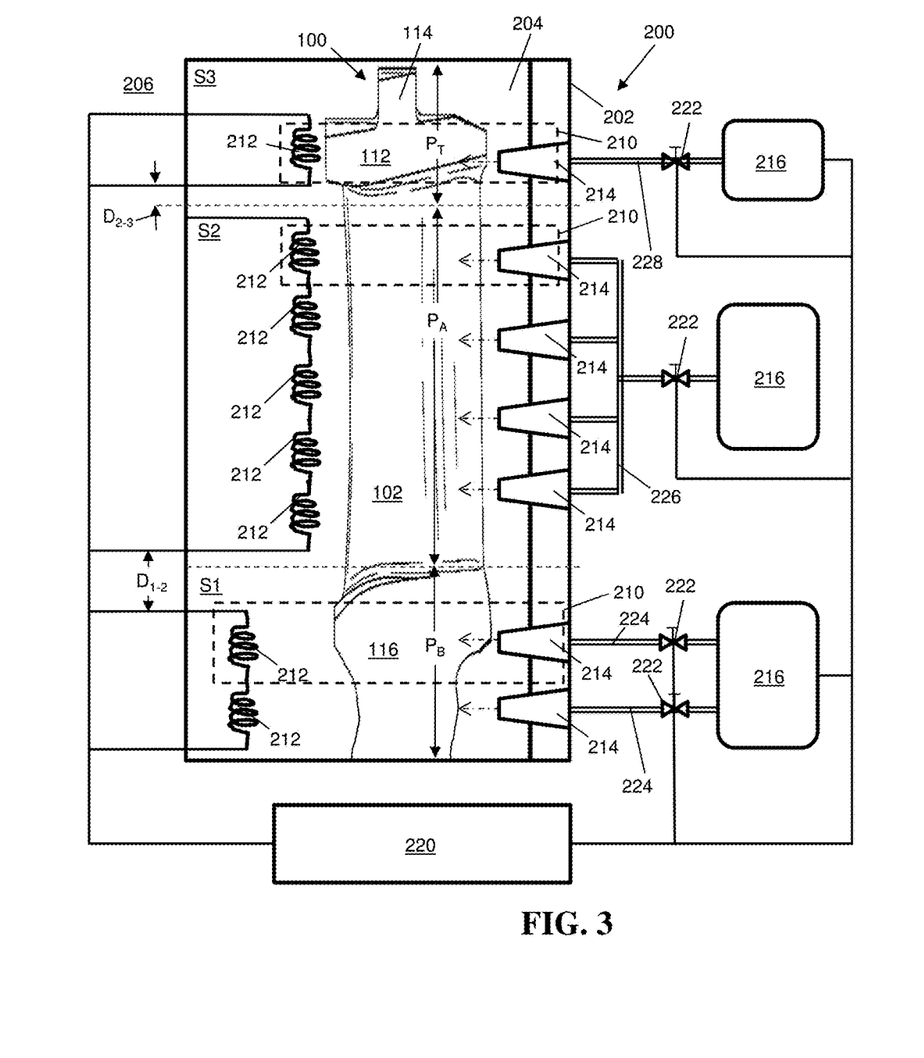
FIG. 3 shows a schematic view of a system for thermal treatment of a workpiece in the form of a turbomachine component according to various embodiments of the present disclosure.

Referring to FIG. 3, embodiments of the disclosure provide a system 200 for thermal treatment of a workpiece. In FIG. 3 and subsequent description, the workpiece being treated in system 200 is shown by example to be an embodiment of component 100. However, it is understood that system 200 may be operable for implementing thermal treatments on various other workpieces, e.g., with little to no modification to various subcomponents of system 200 described herein. For clarity of explanation, the example workpiece within system 200 is indicated and referred to herein as component 100. Component 100 may be mechanically coupled to internal surfaces of enclosure 202, e.g., by one or more coupling components (not shown) adapted to hold component 100 in desired positions, which may be a fixed position in some cases. Component 100 may be enclosed by an enclosure 202 having an interior 204 sized to enclose component 100 from an external environment 206. Enclosure 202 may take the form of a vacuum chamber capable of removing all air particles from interior 204, and in an example implantation may substantially eliminate all pressure within interior 204. In an example implementation, enclosure 202 may be a vacuum chamber capable of maintaining a pressure of at most approximately 0.013 millibar. In alternative implementations, where enclosure 202 is configured to maintain a pressurized atmosphere, interior 204 may be maintained at a pressure between approximately 1.0 bar and 12 bar. External environment 206 may have an ambient temperature, pressure, and chemical composition (e.g., room temperature, atmospheric pressure, and atmospheric composition). Enclosure 202 may be manufactured to include a seal, i.e., any sealing component capable of fluidly separating interior 204 from environment 206. Thus, component 100 may undergo thermal treatments within system 200 without interference by the temperature, pressure, composition, etc., of environment 206. Enclosure 202 may be sealed from environment 206 by one or more sealing components by being manufactured to include, e.g., an epoxy-based seal, a glass-to-metal seal, a ceramic-to-metal seal, etc.

Interior 204 may be subdivided into multiple portions based on the position of component 100 therein, and/or the position of various heating and cooling components in thermal and/or fluid communication with interior 204. For example, interior 204 may include a first portion S1 sized to accommodate a first portion (e.g., base portion $P_B$) of component 100, a second portion S2 sized to accommodate a second portion (e.g., airfoil portion $P_A$) of component 100, and/or a third portion S3 sized to accommodate a third portion (e.g., tip portion $P_T$) of component 100. In various further embodiments, interior 204 may include only two portions (e.g., first and second portions S1, S2) or may have more than three portions, e.g., five portions, ten portions, one-hundred portions, etc. According to an example, base portion $P_B$ may traverse first portion S1 of interior 204, airfoil portion $P_A$ may traverse second portion S2 of interior 204, and tip portion $P_T$ may traverse third portion S3 of interior 204. In further examples, each portion S1, S2, S3 may be distinguished from each other based on the position and/or number of thermal applicators therein, the shape of interior 204 within each portion S1, S2, S3, and/or with the aid of dividing features such as barriers, thermally insulating dividers, and/or other subcomponents. System 200 may be configured to apply different thermal treatments to different portions $P_B$, $P_A$, $P_T$ of component 100 located in each portion S1, S2, S3 of interior 204.

To implement various thermal treatments on component 100, system 200 may include thermal applicators 210 in thermal communication with interior 204 of enclosure 202 at various locations. Thermal applicators 210 may take a variety of forms, and however implemented may be configured for heating and/or cooling of respective locations within interior 204 of enclosure 202. According to an example, one or more thermal applicators 210 may include, e.g., one or more heating elements 212 in combination with one or more cooling elements 214, each of which may be in thermal communication with a subsection of component 100. Heating element(s) 212 of thermal applicator(s) may include, e.g., an inductive heating coil and/or other types of electrical heating elements. In the case of an induction heating cool, heating element(s) 212 may be formed of graphite, molybdenum, a molybdenum-lanthanum alloy, silicon carbide, molybdenum disilicide, and/or any currently known or later developed material operable for use in an inductive heating coil. Heating element(s) 212 may also include any other currently known or later developed heating device including non-electric heating devices, e.g., a fan heater, a gas-based heater, a heat exchanger, and/or any other device capable of raising the temperature within a respective portion S1, S2, S3 of interior 204.

Thermal applicator(s) 210 may also include one or more cooling element(s) 214 configured to decrease the temperature within a respective portion S1, S2, S3 of interior 204. In various embodiments, cooling element(s) 214 may take the form of a cooling fluid injector in fluid communication with interior 204. In such cases, cooling element(s) 214 may be in fluid communication with a cooling fluid supply 216 having, for example, an inert gas capable of absorbing heat when injected within interior 204. Such gases may include, e.g., argon (Ar), helium (He), nitrogen (N), and/or air. In further examples, cooling element(s) 214 may include one or more of, e.g., a heat pump, a solid state refrigerant circuit, etc. Although heating and cooling elements 212, 214 of thermal applicator(s) 210 are shown by example as being structurally independent of each other, it is understood that heating element(s) 212 and/or cooling element(s) 214 may be combined into a single element for heating and/or cooling component(s) 100 within interior 204.

Heating element(s) 212 and cooling element(s) 214 may be configured for independent heating and cooling of component(s) 100 within interior 204. That is, heating element(s) 212 may be capable of operating independently of cooling element 214 and vice versa, despite heating element(s) 212 and cooling element(s) 214 together constituting one thermal applicator 210 of system 200. Additionally, each thermal applicator 210 may be positioned in only one portion S1, S2, or S3 of interior 204. During operation, embodiments of system 200 may apply different types of thermal treatments to different portions $P_B$, $P_A$, $P_T$ of component 100 using thermal applicators 210.

To control the various thermal treatments applied to component 100, system 200 may include a controller 220 communicatively coupled to thermal applicators 210 of system 200. As discussed in further detail herein, controller 220 may take the form of a computing device configured to electrically control various operating settings of thermal applicators 210. According to an example, controller 220 may be electrically coupled to various heating elements 212 to control the thermal energy output of one or more heating elements 212 within interior 204. In an example where heating elements 212 take the form of inductive heating coils, each heating element(s) 212 may be electrically adjustable via controller 220 to modify variables such as heating temperature, heating time, heating rate, etc., during operation. In embodiments where heating elements 212 take other forms, controller 220 and/or the various coupling and/or converting components between heating element(s) 212 and controller 220 may be modified as desired to convert electrical signals into modifications to the operation of applicable type of heating element(s) 212. In still further embodiments, heating element(s) 212 may be manually operated and/or adjusted without the aid of controller 220.

Controller 220 may also be coupled to cooling fluid supply and/or a set of valves 222 for controlling the amount of cooling fluid extracted from at least one cooling fluid supply 216. Each valve may control the amount of cooling fluids provided to respective cooling element(s) 214 (e.g., cooling fluid injectors) via various fluid couplings. For example, one valve 222 may control an amount of cooling fluid delivered from a respective cooling fluid supply 216 via a first passage 224 to cooling element(s) 214 in first portion S1 of interior 204. Another valve 222 may control an amount of cooling fluid delivered from another cooling fluid supply 216 via a second passage 226 to cooling element(s) 214 in second portion S2 of interior 204. Yet another valve 222 may control an amount of cooling fluid delivered from another cooling fluid supply 216 via a third passage 228 to cooling element(s) 214 in third portion S3 of interior 204. Each cooling fluid supply 216 may include a distinct gas, such that different cooling gases are injected to each portion S1, S2, S3 of interior 204. According to an example, first portion S1 may receive only helium from cooling element(s) 214, second portion S2 may receive only nitrogen from cooling element(s) 214, and third portion S3 may receive only air from cooling element(s) 214. Valves 222 may be embodied as two-way valves for controlling an amount of cooling fluid directed to different portions S1, S2, S3 of interior 204. Valves 222 in further embodiments may include a system of valves within each passage 224, 226, 228, and/or multidirectional valves configured for controlling the amount of cooling fluid provided to each cooling element 214 of system 200. Valve(s) 222 may be electrically or electromechanically adjustable via controller 220 to modify variables such as cooling temperature and/or cooling rates during operation. In this case, controller 220 may govern the operation of each thermal applicator 210 as system 200 operates, and according to various operational methodologies as discussed herein. In still further embodiments, cooling gas supplies 216 and their respective valves 222 may be operated or adjusted manually without the aid of controller 220.

According to one non-limiting example, controller 220 may be communicatively coupled to multiple thermal applicators 210. Each thermal applicator 210 may be positioned in a respective portion S1, S2, S3 of interior 204. Thermal applicators 210 thus may apply respective amounts of heating and cooling to different portions of component 100, e.g., base portion $P_B$, airfoil portion $P_A$, and/or tip portion $P_T$. During operation, thermal applicator(s) 210 in first portion S1 of interior 204 may apply a first thermal treatment to a selected portion of component 100, e.g., base portion $P_B$. The first thermal treatment may include heating the selected portion of component 100 to a first temperature, maintaining the first temperature for a first time span, and thereafter cooling component 100 at a first cooling rate. According to one non-limiting example, the first thermal treatment may include heating component to a temperature of at most approximately 1100 degrees Celsius (° C.), maintaining the temperature for a time span of approximately five hours, and thereafter cooling component at a cooling rate of at most 75° C. per second. Sequentially or simultaneously, thermal applicator(s) 210 in second portion S2 of interior 204 may apply a second thermal treatment to another selected portion of component 100, e.g., airfoil portion $P_A$. The second thermal treatment may itself include heating the selected portion to a second temperature, maintaining the second temperature for a second time span, and thereafter cooling component 100 at a second cooling rate. According to an example, the second thermal treatment may include heating component to a temperature of at least approximately 1240 degrees Celsius (° C.), maintaining the second temperature for a time span of approximately three hours, and thereafter cooling component at a cooling rate of at most 150° C. per second. Thus, the first and second temperatures, time spans, and cooling rates may be different from each other to form different material properties in each portion $P_B$, $P_A$ of component 100. In further examples, embodiments of the disclosure may include simultaneously and/or sequentially using thermal applicator(s) 210 in third portion S3 of interior 204 to apply a third thermal treatment to another portion of component 100, e.g., tip portion $P_T$. The third thermal treatment, similar to other thermal treatments, may be defined in terms of its operational parameters. Specifically, the third thermal treatment may include heating the selected portion to a third temperature (e.g., between approximately 1100 and 1240° C.), maintaining the third temperature for a third time span (e.g., between approximately three and five hours), and thereafter cooling component 100 at a third cooling rate (e.g., between approximately 75° C. per second and approximately 150° C. per second), each of which may be different from the corresponding parameters of the first and second thermal treatments.

To prevent deviation from the desired parameters of each thermal treatment, system 200 may be structured to prevent deviation from the desired parameters of thermal treatment as component 100 undergoes each thermal treatment. During operation, the position of thermal applicator(s) 210 within portions S1, S2, S3 of interior 204 may cause each thermal treatment to have substantially no effect on portions of component 100 outside a respective area. For example, two adjacent thermal applicators 210 positioned in respective portions S1, S2 of interior 204 may be separated by a distance $D_{1-2}$, e.g., at least fifty centimeters. Similarly two adjacent thermal applicators 210 positioned in respective portions S2, S3 of interior 204 may be separated by a distance $D_{2-3}$, e.g., at least twenty-five centimeters. The separation distance between adjacent thermal applicators 210 in different portions S1, S2, S3 may be any amount sufficient to prevent adjacent portions of component 100 from being affected by the adjacent thermal treatment. According to various embodiments, "substantially no effect" may be construed as component(s) 100 portion in which at most two percent of the material composition includes properties induced by thermal treatments applied to other portions of component(s) 100. Such properties may include, e.g., creep resistance, fracture toughness, distribution of precipitates, etc., as discussed elsewhere herein. The term "substantially no effect" may also refer to a thermal treatment causing a desired temperature change in a targeted portion of component 100 without causing the same temperature change in a non-targeted portion of component 100.

Figure 4:
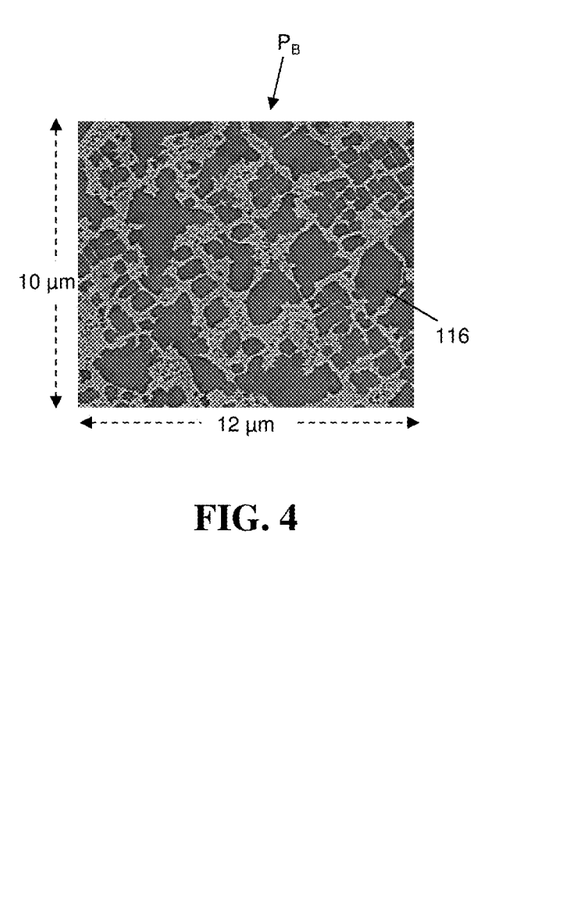
FIG. 4 shows an illustrative diagram of particle distribution within a workpiece in the form of a turbomachine component according to various embodiments of the present disclosure.
Figure 5:
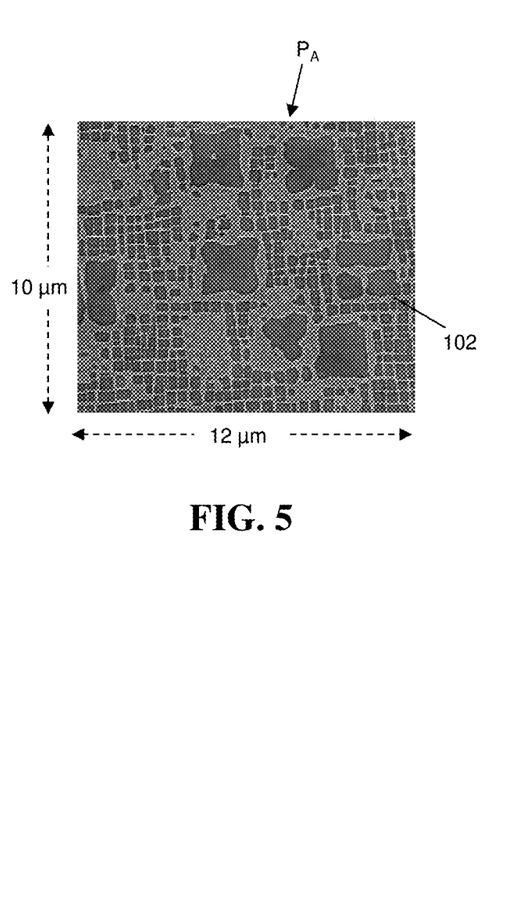
FIG. 5 shows an illustrative diagram of particle distribution within another portion of a workpiece in the form of turbomachine component according to various embodiments of the present disclosure.

Referring now to FIGS. 3-5 together, applying multiple thermal treatments to different portions (e.g., portions $P_B$, $P_A$, $P_T$) of component 100 via system 200 may produce varying material properties in a single unit of component 100. FIG. 4 provides an example particle composition of base portion $P_B$ on a micrometer (μm) scale after applying a first thermal treatment, and FIG. 5 provides an example particle composition of airfoil portion $P_A$ on a μm scale after applying a second thermal treatment. In the example of FIG. 4, a first thermal treatment with a first temperature, heating time, and cooling rate may be a material with a coarse particle size and distribution. In the example of FIG. 5, a second thermal treatment with a second temperature greater than the first temperature, a second cooling rate greater than the first cooling rate, and a second heating time may produce fine particle sizes arranged in a more uniform distribution. In such an example, base portion $P_B$ (FIG. 4) of component 100 may feature an average superalloy particle size of between approximately 0.25 μm to approximately 0.75 μm. In metallurgy, a particle size may be considered "coarse" as result of having a diameter of more than one μm. By contrast, airfoil portion $P_A$ of component 100 may feature a combination of coarse superalloy particles and "fine" superalloy particles, i.e., those having a diameter of at most one μm. FIG. 5 illustrates a combination of particles having a coarse diameter, e.g., approximately two μm, and particles having a fine diameter, e.g., approximately 0.4 μm. The coarse superalloy particles in airfoil portion $P_A$ of component 100 may constitute, e.g., at most approximately ten percent of the material composition. The remaining fine superalloy particles may be known as "gamma prime phase precipitates."

The different material properties arising from each thermal treatment may be associated with significantly different material properties. The applied thermal treatments and the resulting properties may be selected based on their suitability for various portions and/or subcomponents of a particular component 100. For instance, portions of component 100 subjected to the second thermal treatment may feature a creep resistance, i.e., ability to withstand minor stresses and strains applied over long periods, than other portions of component 100 subjected to the first thermal treatment and/or other thermal treatments. Creep resistance, or "creep strength," may be measured and expressed by the amount of stress (measured, e.g., in kilopascals (kPa)) which causes a material to fail after a predetermined time period, most frequently ten-thousand hours or one-hundred thousand hours. Thus, the second thermal treatment may be particularly suitable for airfoil portion $P_A$ and/or any portions of component 100 in fluid communication with flowpath FP (FIG. 2).

Portions of component 100 subjected to the first thermal treatment may feature different material strengths and weaknesses compared to those subjected to the second thermal treatment. For example, portions of component 100 subjected to the first thermal treatment may feature a fracture toughness that is greater than a fracture toughness of portions that undergo a different type of thermal treatment. Fracture toughness refers to the material toughness that can be accumulated until a fracture occurs. Fracture toughness may be measured in units of, e.g., joules per square centimeter ($J/cm^2$), referring to the amount of energy absorbed per surface area at the time of a fracture. The first thermal treatment may be suitable for any portions of component 100 which experience higher immediate stresses and/or strains, such as coupling components for mounting on other components, e.g., rotor 12 (FIG. 1).

Gamma phase precipitates may be composed of the metal(s) used to strengthen the alloy composition, e.g., nickel (Ni). Gamma prime phase precipitates are an intermetallic material in which the particles are located, e.g., lattice faces or edges within the superalloy material. As gamma prime phase precipitates aggregate, they decrease their energy states by aligning along to form cuboidal structures. Such structures may provide a greater fracture toughness as compared to structures without a substantially uniform distribution of gamma phase precipitates. Considering these properties, the first and second thermal treatments may differ, e.g., in that the first thermal treatment does not create a uniform distribution of gamma prime phase precipitates within the thermally treated material, while the second thermal treatment creates a uniform distribution of gamma prime phase precipitates within the thermally treated material. The absence of a uniform distribution of gamma prime phase precipitates, e.g., as shown in base portion $P_B$ of FIG. 4, may provide greater ductility due to the predominantly (e.g., greater than fifty percent) concentration of coarse superalloy particles therein. Such properties may cause a creep resistance of materials treated with the third thermal treatment to be less than any materials treated with the second thermal treatment but greater than any materials treated with the first thermal treatment. Additionally, materials treated with the third thermal treatment may feature a fracture toughness that is less than materials treated with the first thermal treatment, but greater than materials treated with the second thermal treatment.

Where applicable, a third thermal applicator 210 of system 200 may apply a third thermal treatment to another portion (e.g., tip portion $P_T$, which may include tip 112, and in some cases, shroud 114) of component 100 to yield material properties different from either the first or second thermal treatments. The third thermal treatment may include, raising a portion (e.g., third portion S3) of interior 204 to a temperature that is higher than that of the first thermal treatment, and cooling component 100 within third portion S3 at a cooling rate that is greater than the first cooling rate but lower than the second cooling rate. The third thermal treatment may cause the treated portion of component(s) 100 to have distinct properties, e.g., a mixture of fine and coarse particles with a non-uniform distribution of gamma prime phase particulates. According to one example, portions of component 100 to which the third thermal treatment is applied may include, e.g., a concentration of between twenty percent and approximately forty percent coarse superalloy particles, and a concentration of between approximately sixty percent and approximately eighty percent fine superalloy particles.

Figure 6:
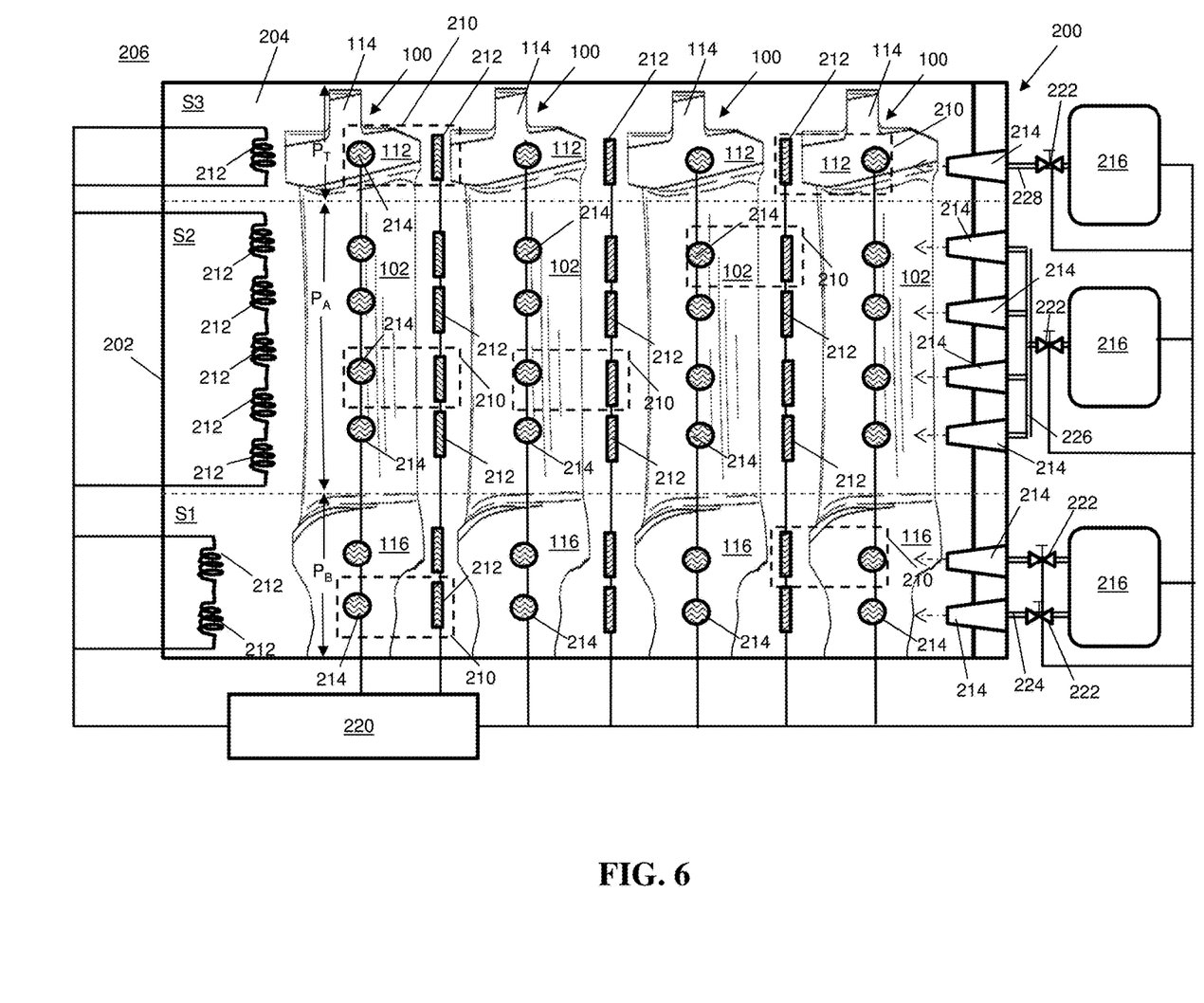
FIG. 6 shows a schematic view of a system for thermal treatment of multiple workpieces in the form of multiple turbomachine components according to various embodiments of the present disclosure.

Referring to FIG. 6, further embodiments of system 200 are shown. Enclosure 202 of system 200 may include, e.g., interior 204 sized to enclose and seal multiple components 100 from environment 206 at once. In such cases, enclosure 202 may remain capable of forming a vacuum or pressurized atmosphere within interior 204. Four components 100 are illustrated for the sake of example, but any possible number of components 100 may be contained within interior 204 based on the size of enclosure 202. Thermal applicators 210 may be arranged to be in thermal communication with components 100 from multiple orientations and at multiple locations within interior 204 of enclosure 202. In an example, controller 220 may be coupled to each thermal applicator 210, including heating element(s) 212 and cooling element(s) 214 thereof, to apply the first, second, and/or third thermal treatment(s) to multiple components 100. In further examples, each thermal applicator 210 may be operated independently and/or manually. Such thermal treatments may be performed simultaneously on each component 100 and their respective portions (e.g., portions $P_B$, $P_A$, $P_T$, thereof), and/or sequentially with respect to successive component(s) 100 and/or portions thereof. The embodiment of system 200 illustrated in FIG. 6 may provide greater scalability than embodiments configured for applying multiple thermal treatments to a single component 100. Additionally, enclosure 202 of system 200 may be sized such that each thermal treatment has substantially no impact on other portions of the same component 100 and/or other components, as discussed elsewhere herein, e.g., with respect to FIG. 3.

Figure 7:
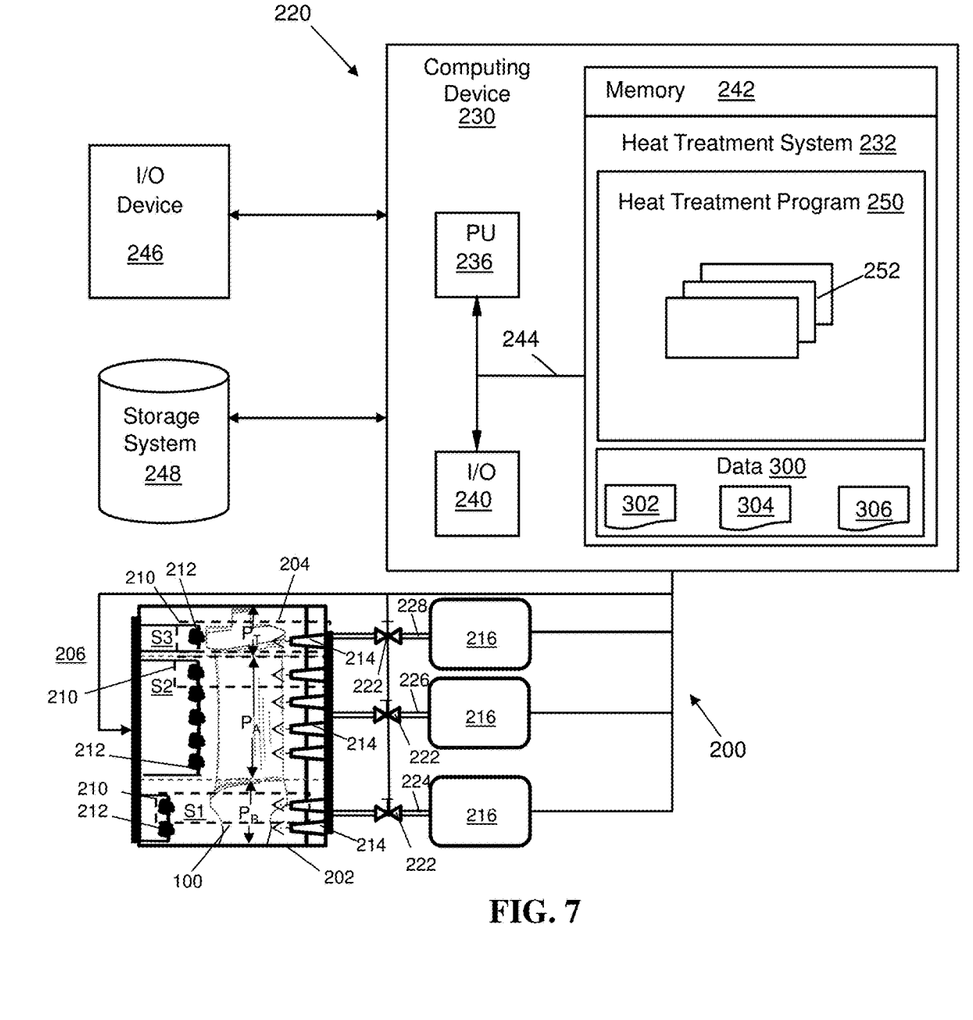
FIG. 7 shows an illustrative diagram of a controller for a system for thermal treatment of a workpiece according to various embodiments of the present disclosure.

FIG. 7 shows an illustrative environment including system 200 according to embodiments of the disclosure, e.g., to better illustrate various features of controller 220 in some embodiments. According to an embodiment, controller 220 includes a computer infrastructure that can perform various process steps described herein for applying multiple thermal treatments to different portions of a workpiece, e.g., component 100. In particular, the computer infrastructure of controller 220 may include a computing device 230 that comprises a thermal treatment system 232, which enables computing device 230 to apply varying thermal treatments to component 100 by performing the process steps of the disclosure.

Computing device 230 is shown including a memory 234, a processor (PU) 236, an input/output (I/O) interface 240, and a bus 244. Further, computing device 230 is shown in communication with an external I/O device/resource 246 and a storage system 248. As is known in the art, in general, processor 236 executes computer program code, such as thermal treatment system 232, that is stored in memory 234 and/or storage system 248. While executing computer program code, processor 236 can read and/or write data 300 to/from memory 234, storage system 248, and/or I/O interface 240. Data 300 may include, e.g., multiple recipes for defining the parameters of various thermal treatments. A first recipe 302 may define the parameters of a first thermal treatment (e.g., a first heating temperature, a time span for holding the first temperature, a first cooling rate, etc.). A second recipe 304 of data 300 may define the parameters of a second thermal treatment (e.g., a second heating temperature, a second time span for holding the second temperature, a second cooling rate, etc.) A third recipe 306 of data 300 may define the parameters of a third thermal treatment (e.g., a third heating temperature, a third time span for holding the third temperature, a third cooling rate, etc.). Bus 244 provides a communications link between each of the components in computing device 230. I/O device 246 can comprise any device that enables a user to interact with computing device 230 or any device that enables computing device 230 to communicate with one or more other computing devices. Input/output devices (including but not limited to keyboards, displays, pointing devices, etc.) can be coupled to the system either directly or through intervening I/O controllers.

In any event, computing device 230 can comprise any general purpose computing article of manufacture capable of executing computer program code installed by a user (e.g., a personal computer, server, handheld device, etc.). However, it is understood that computing device 230 and thermal treatment system 232 are only representative of various possible equivalent computing devices that may perform the various process steps of the disclosure. To this extent, in other embodiments, computing device 230 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, controller 220 with computing device 230 is only illustrative of various types of computer infrastructures for implementing the disclosure. For example, in one embodiment, computer controller 220 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Controller 220 can include thermal treatment system 232, which executes a thermal treatment program 250 for implementing various methods according to the disclosure by controlling and/or acting upon enclosure 202, thermal applicators 210, etc. Thermal treatment program 250 in turn may include various modules 252, e.g., one or more software components configured to perform different actions, including without limitation: a calculator, a determinator, a comparator, etc. Modules 252 can implement any currently known or later developed algorithm for causing thermal applicator(s) 210 coupled to controller 220 to heat and cool component 100 according to various parameters, e.g., as reflected in data 300. As shown, computing device 230 may be communicatively coupled to thermal applicators 210 to implement heating and cooling as defined by various parameters for each thermal treatment, e.g., in data 300.

Modules 252 of thermal treatment program 250 in some cases can use calculations, look up tables, and similar tools stored in memory 242 for processing, analyzing, and operating on data to perform their respective functions, e.g., maintaining a desired temperature over a particular time period. In general, processor 236 can execute computer program code, such as thermal treatment program 250, which can be stored in memory 242 and/or storage system 248. Memory 242 and/or storage system 248 thus may represent any suitable memory or storage device (internal, external, cloud-based and so on) on and/or associated with controller 220. While executing computer program code, processor 236 can read and/or write data to or from memory 242, storage system 248, and/or I/O interface 240. Bus 244 can provide a communications link between each of the components in computing device 230. I/O device 240 can comprise any device that enables a user to interact with computing device 230 or any device that enables computing device 230 to communicate with the equipment described herein (e.g., other portions of system 200) and/or other computing devices.

Technical effects of the disclosure are to provide a system for thermal treatment of workpieces, e.g., turbomachine components, and turbomachine components with varying properties arising from varying thermal treatments applied thereto. During operation, the stress and exposure temperature of a component may vary throughout the component. Embodiments of the disclosure apply varying thermal treatments to a component to provide varying amounts of fracture toughness and creep resistance, depending on the intended application of the component. Embodiments of the disclosure allow different areas of a single workpiece, e.g., a turbomachine component, to more easily withstand the varying mechanical factors, e.g., mechanical creep in one area as compared to immediate stresses in another. Embodiments of the disclosure thus also include turbomachines and/or other devices which include multiple components subjected to different thermal treatments at different locations, and thus having different material properties at the different locations.

Advantages of the disclosure may provide a single thermal treatment system for yielding components with non-uniform amounts of creep resistance and fracture toughness. A controller of such a system may independently operate various thermal applicators to apply different amounts and/or rates of heating and cooling to create varying material properties within an initially homogenous component. Such differing properties, in some cases, may include varying particle sizes and/or distribution of phases within the material, including gamma prime phase precipitates.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbomachine component, comprising:
a base portion configured for mounting on a rotor;
an airfoil portion having a first end coupled to the base portion, and a second end opposite the first end, wherein a creep resistance of the airfoil portion is greater than the base portion, and wherein a fracture toughness of the airfoil portion is less than the base portion; and a tip portion coupled to the second end of the airfoil portion, wherein a creep resistance of the tip portion is less than the airfoil portion and greater than the base portion, and wherein a fracture toughness of the tip portion is less than the base portion and greater than the airfoil portion.

2. The turbomachine component of claim 1, wherein each of the base portion, the airfoil portion, and the tip portion of the airfoil component are formed of a single alloy or superalloy material.

3. The turbomachine component of claim 1, wherein a material composition of the airfoil portion includes a substantially uniform distribution of gamma prime phase precipitates, and wherein a material composition of the base portion and a material composition of the tip portion do not include the substantially uniform distribution of gamma prime phase precipitates.

4. The turbomachine component of claim 1, wherein a material composition of the tip portion includes a particle size larger than a particle size of a material composition of the airfoil portion.

5. The turbomachine component of claim 4, wherein a material composition of the base portion includes a particle size larger than a material composition of the airfoil portion, and smaller than the particle size of the material composition of the base portion.

6. The turbomachine component of claim 1, wherein a ductility of the base portion is greater than a ductility of the airfoil portion and a ductility of the tip portion.

7. The turbomachine component of claim 1, wherein the airfoil component further includes a shroud portion coupled to the tip portion, wherein a fracture toughness and a creep resistance of the shroud are approximately equal to the tip portion.

8. A turbomachine having an interior flowpath, the turbomachine comprising:
a rotor; and
a plurality of rotatable blade structures coupled to the rotor and positioned within the interior flowpath, at least one of the plurality of blade structures including:
a base portion having an inner radial surface coupled to the rotor,
an airfoil portion having an inner radial end coupled to the base portion, and an outer radial end opposite the inner radial end, wherein a creep resistance of the airfoil portion is greater than the base portion, and wherein a fracture toughness of the airfoil portion is less than the base portion, and
a tip portion coupled to the outer radial end of the airfoil portion, wherein a creep resistance of the tip portion is less than the airfoil portion and greater than the base portion, and wherein a fracture toughness of the tip portion is less than the base portion and greater than the airfoil portion.

9. The turbomachine of claim 8, wherein each of the base portion, the airfoil portion, and the tip portion are formed of a single alloy or superalloy material.

10. The turbomachine of claim 8, wherein a material composition of the airfoil portion includes a substantially uniform distribution of gamma prime phase precipitates, and wherein a material composition of the base portion and a material composition of the tip portion do not include the substantially uniform distribution of gamma prime phase precipitates.

11. The turbomachine of claim 8, wherein a material composition of the base portion includes a particle size larger than a particle size of a material composition of the airfoil portion.

12. The turbomachine of claim 11, wherein a material composition of the tip portion includes a particle size larger than a material composition of the airfoil portion, and smaller than the particle size of the material composition of the base portion.

13. The turbomachine of claim 8, wherein a ductility of the base portion is greater than a ductility of the airfoil portion and a ductility of the tip portion.

14. The turbomachine of claim 8, wherein the at least one of the plurality of blade structures further includes a shroud portion coupled to the tip portion, wherein a fracture toughness and a creep resistance of the shroud are approximately equal to the tip portion.

15. A method for heat treating a turbomachine component formed of a superalloy material, the method comprising:
applying a first heat treatment to a base portion of the turbomachine component, the base portion being configured for mounting on a rotor, wherein the first heat treatment includes heating the base portion to a first temperature, holding the base portion at the first temperature for a first time span, and cooling the base portion at a first cooling rate;
applying a second heat treatment to an airfoil portion of the turbomachine component independently of the first heat treatment, the airfoil portion having a first end coupled to the base portion, and a second end opposite the first end, wherein the second heat treatment includes heating the airfoil portion to a second temperature different from the first temperature, holding the airfoil portion at the second temperature for a second time span different from the first time span, and cooling the airfoil portion at a second cooling rate different from the first cooling rate; such that a creep resistance of the airfoil portion is greater than the base portion, and a fracture toughness of the airfoil portion is less than the base portion; and
applying a third heat treatment to a tip portion of the turbomachine component independently of the first heat treatment and the second heat treatment, the tip portion being coupled to the airfoil portion, wherein the third heat treatment includes heating the tip portion to a third temperature different from the first temperature and the second temperature, holding the tip portion at the third temperature for a third time span different from the first time span and the second time span, and cooling the airfoil portion at a third cooling rate different from the first cooling rate and the second cooling rate, such that a creep resistance of the tip portion is less than the airfoil portion and greater than the base portion, and a fracture toughness of the tip portion is less than the base portion and greater than the airfoil portion.

16. The method of claim 15, wherein the second temperature is greater than the first temperature, and wherein the second cooling rate is greater than the first cooling rate.

17. The method of claim 16, wherein the third temperature is between the first and second temperatures, and wherein the third cooling rate is between the first and second cooling rates.

18. The method of claim 15, wherein the first heat treatment causes a ductility of the base portion to be greater than a ductility of the airfoil portion and a ductility of the tip portion.

19. The method of claim 15, wherein the second heat treatment forms a substantially uniform distribution of gamma prime phase precipitates within the airfoil portion of the turbomachine component.

20. The method of claim 15, further comprising applying the third heat treatment to a shroud portion of the turbomachine component coupled to the tip portion.

* * * * *